June 7, 1955          E. A. JUZWIAK          2,710,116
ADJUSTMENT MECHANISM FOR SEED AND FERTILIZER SPREADERS
Filed Oct. 11, 1952          5 Sheets-Sheet 1
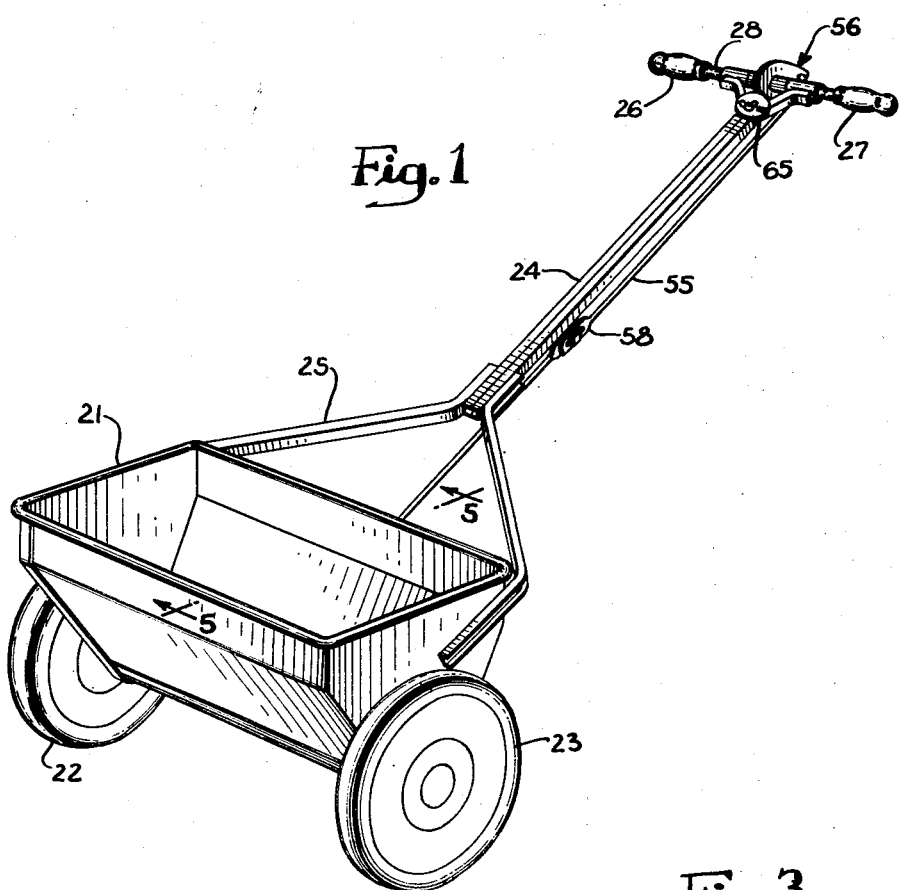
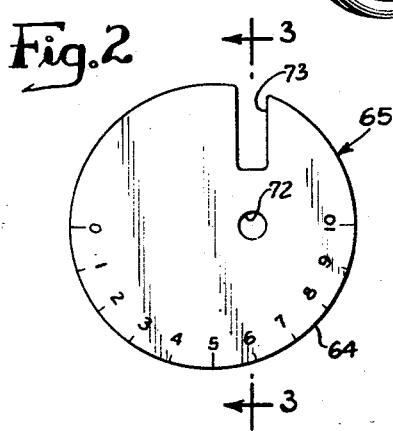
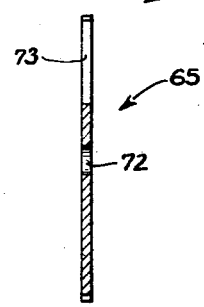
INVENTOR.
Edmond A. Juzwiak
BY
Kegan and Kipnis
attys.

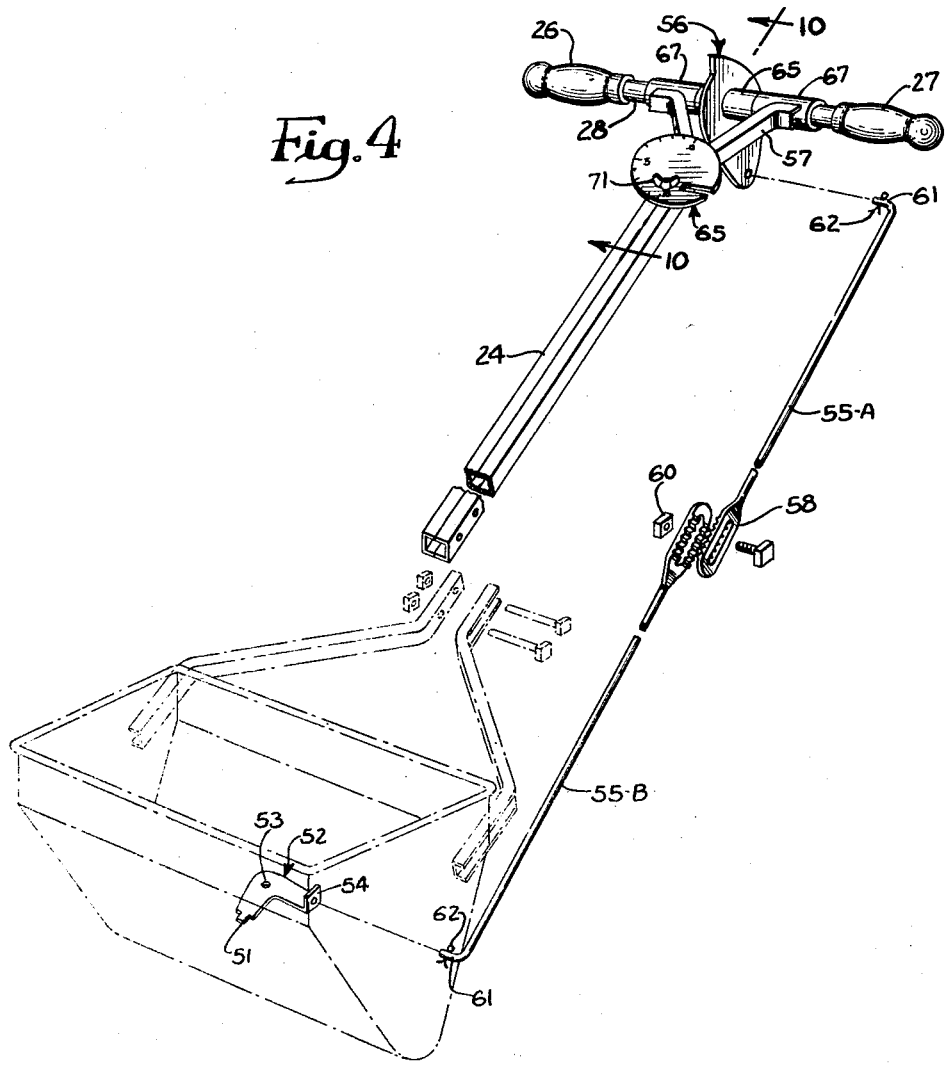

June 7, 1955 E. A. JUZWIAK 2,710,116
ADJUSTMENT MECHANISM FOR SEED AND FERTILIZER SPREADERS
Filed Oct. 11, 1952 5 Sheets-Sheet 3
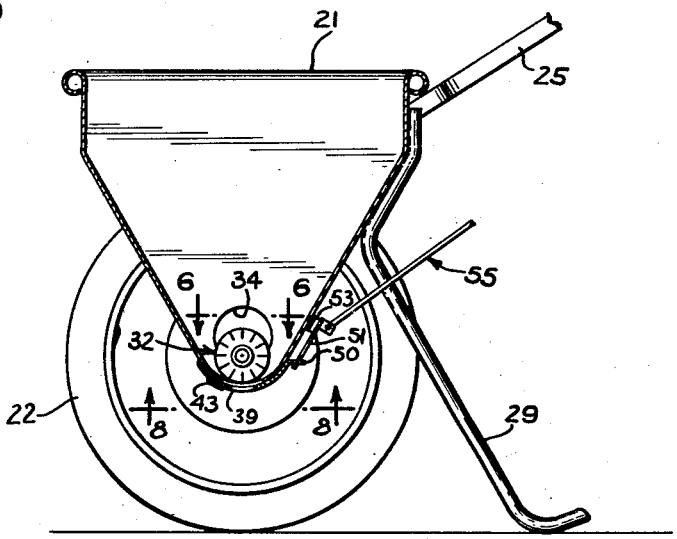
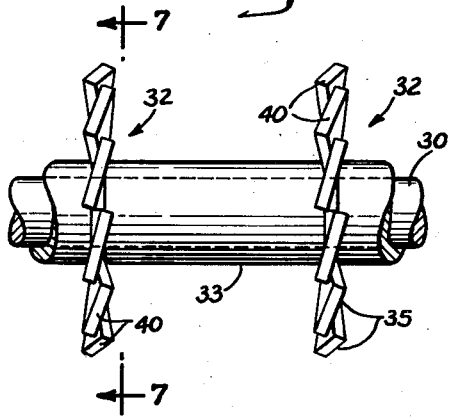
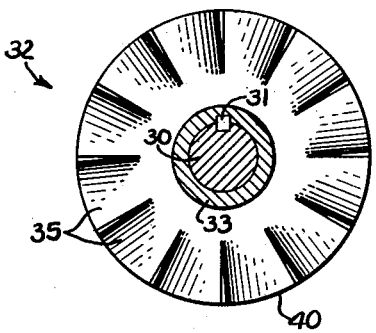
INVENTOR.
Edmond A. Juzwiak
BY
Kegan and Kipnis
Attys.

INVENTOR.
Edmond A. Juzwiak
BY
Kegan and Kipnis
Attys.

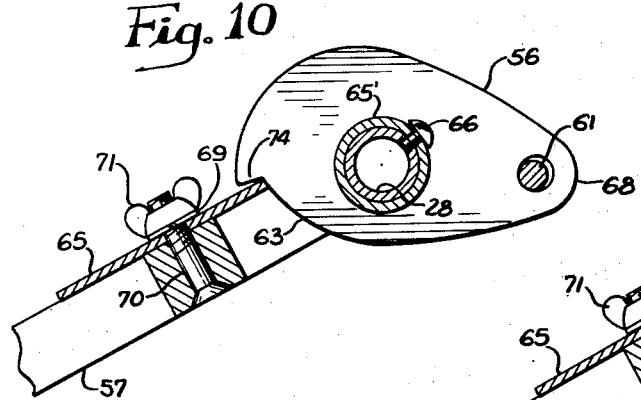
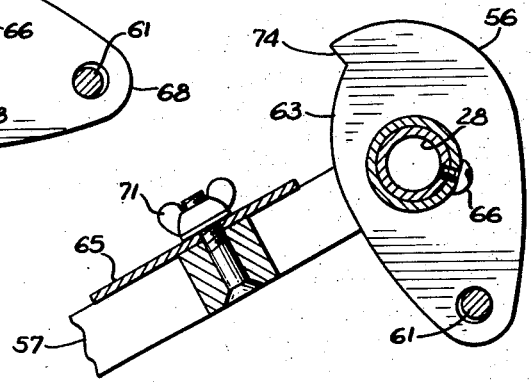
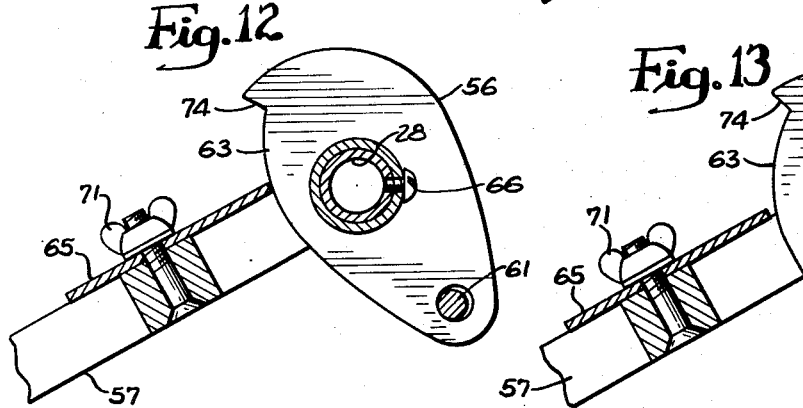
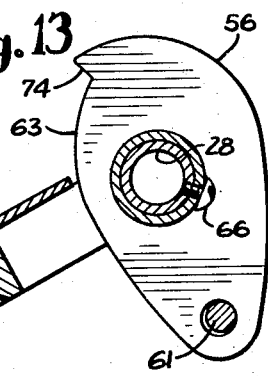
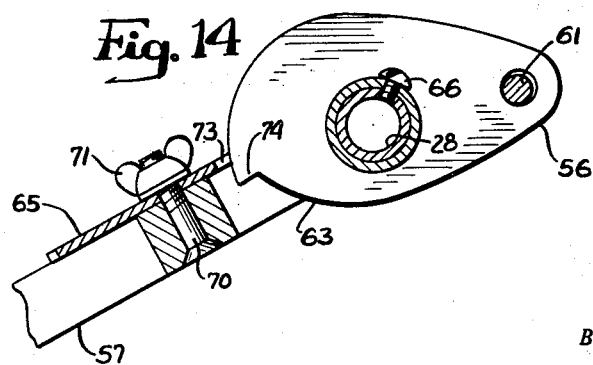

United States Patent Office 2,710,116
Patented June 7, 1955

2,710,116

ADJUSTMENT MECHANISM FOR SEED AND FERTILIZER SPREADERS

Edmond A. Juzwiak, Chicago, Ill., assignor, by mesne assignments, to Avco Manufacturing Corporation, New York, N. Y., a corporation of Delaware Application October 11, 1952, Serial No. 314,327

9 Claims. (Cl. 222—177)

This invention relates to material spreaders such as seed and fertilizer spreaders; particularly to an improved mechanism for the adjustment of such a device.

Basically such adjustment is provided by providing an elongated, preferably agitated hopper for the seed or fertilizer, with a series of discharge openings and a superimposed shutter strip with a matching series of openings. The strip can be shifted so as to expose variable parts of the areas of the openings. The openings themselves and also the shifting movements are very small, in comparison with the usual irregularities of the ground over which the material is spread. In other words, a certain degree of precision mechanics is required, at a point which also calls for great sturdiness and strength of the mechanical parts.

I have discovered a new and improved manner of insuring the required accuracy; mainly in hand-operated spreaders. Here, a two-handled handlebar is usually provided. Improvement is possible both mechanically and functionally by using this handlebar as part of the adjustment mechanism.

The shutter should allow easy, quick removal and reinsertion, without special tools. Improved arrangements for this purpose can be combined with the new mechanism. The objects mentioned and implied in the foregoing discussion are achieved by the new spreader control mechanism; mainly by the following features of the same: The shutter strip is slidably, adjustably and removably retained on the bottom or side wall of the hopper, by an elongated groove joint along one elongated edge of the strip and by a plurality of key hole joints along the opposite edge. The strip is removable when the wide parts of the key holes are in register with corresponding pins. It is adjustable for different discharge characteristics when the narrow parts of the key holes are in register with the corresponding pins. Sliding of the strip for removal and adjustment is controlled, through simple linkage, by a control device on the handlebar section of the spreader. This device comprises a part fastened to and turnable with the handlebar, and a cooperating stationary stop member. The stop member is adjustable to provide for different degrees of opening of the shutter strip, and for an auxiliary setting which allows removal of the shutter strip. The control members are simply, economically and efficiently provided by two flat plates. One plate comprises a cam surface and a lever extension and preferably also a stop projection. The other plate is circular, eccentrically pivoted, peripherally graduated and locally indented. Both are secured to the top of the pusher bar of the unit, in the direct line of sight of the user.

Detailed and auxiliary features of the mechanism and objects and advantages connected therewith will appear from the following specific description of a preferred embodiment, and from the drawing wherein this embodiment is diagrammatically shown. For greater clarity, the description is explicit and the drawing detailed, but it must be understood that the disclosure is exemplary only. The scope of the invention is defined in the appended claims.

In the drawing:

Figure 1 is a perspective view of a typical spreader unit comprising this invention.

Figure 2 is a top view of the stop plate of the adjustment mechanism.

Figure 3 is a section through the plate of Figure 2, along lines 3—3 in that figure.

Figure 4 is an exploded perspective view of the entire adjustment mechanism.

Figure 5 is a partial sectional view of the unit, along lines 5—5 in Figure 1.

Figure 6 is an enlarged view of agitators for the spreader, seen along lines 6—6 in Figure 5.

Figure 7 is a section through Figure 6 along lines 7—7.

Figure 10 is an enlarged section through the handlebar and control device, along lines 10—10 in Figure 4.

Figure 11 is a view similar to Figure 10 but showing one of the control parts in a different position; the shutter being wide open in Figure 10 and closed in Figure 11.

Figure 12 is a view similar to Figures 10 and 11 but illustrating a different adjustment of the stop plate.

Figure 13 is a view generally similar to Figure 12 but showing a different position of the control part cooperating with the stop plate; the shutter openings being opened to a small extent in Figure 12 and being closed in Figure 13. The closed positions of Figures 11 and 13 differ only as to the setting of the stop plate.

Figure 14 is a view generally similar to Figures 10 etc. but showing still another position, wherein the control plates are set for removal of the shutter from the hopper.

Figure 8:
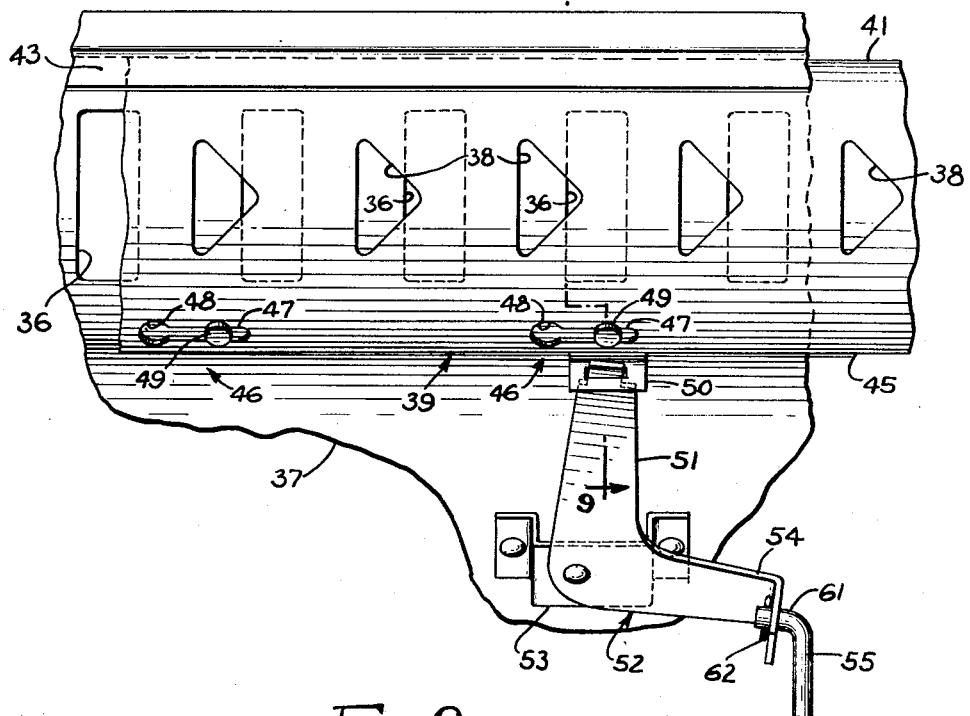
Figure 8 is a bottom view of the adjustment shutter seen along lines 8—8 in Figure 5.

The spreader unit as shown in Figure 1 comprises a reservoir hopper or bin 21 supported by a pair of wheels 22, 23. The unit has a pusher bar 24, secured to the hopper 21 by a yoke 25 and extending backwards therefrom. The user pushes the unit over his lawn by a pair of handles 26, 27, secured to a handlebar 28 at the free end of the pusher bar 24. When not in use, the unit may be supported in approximately upright position by a leg 29 shown in Figure 5.

As shown in that figure and Figures 6 and 7, a shaft or axle 30 extends through the hopper. It is rotatable with one or both of the wheels 22, 23. Suitably secured to this shaft, for instance by keys 31, is a series of agitators 32, spaced from one another by collars 33. The assembly of shaft 30, agitators 32 and collars 33 may be removed from the hopper through a side opening 34, suitably closed in normal operation of the device. Agitators 32 of the form shown may be stamped from sheet metal or the like, providing a peripheral series of vanes 35.

Figure 9:
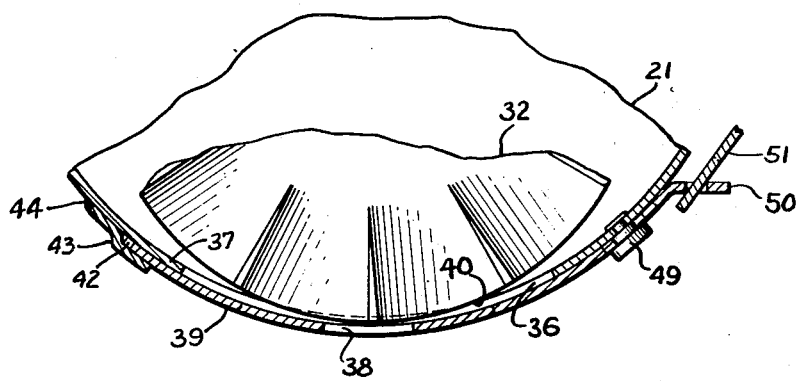
Figure 9 is a section through Figure 8 along lines 9—9.

As best shown in Figures 8 and 9, discharge openings 36 are formed in the bottom 37 of the hopper 21. These openings are adjusted by further discharge openings 38 in the shutter plate 39. The openings 36 and 38 form a series extending along the hopper bottom, between the wheels 22 and 23.

Preferably each hopper opening 36 is rectangular and elongated in a direction transverse to shaft 30, in order to allow peripheral edges 40 of the agitator vanes 35 to enter into and pass along the hopper opening 36. As a result the working edges 40 of suitably tilted agitator vanes perform the double function of charging the discharge openings 36 with material and positively discharging the material therefrom while the side and edge surfaces of the vanes perform a third, agitating function. The principles used in this respect are known from my earlier patent No. 2,510,231.

The shutter openings 38 are approximately as wide and long as are the hopper openings 36. However, each shutter opening tapers from one of its long sides, in the form of an isosceles triangle having said side as a base. Thus it is possible to feed material from the hopper 21, by the agitators 32, either through the full area of each shutter opening 38 or through diminishing portions of that area, depending upon the extent to which the shutter is shifted, from the right to the left as seen in Figure 8.

Shifting of the shutter plate is allowed only in a direction along the series of openings. For this purpose, one longitudinal edge 41 of the shutter plate is retained in a longitudinal groove 42, formed by a suitably bent strip 43 which is secured to the outside of the hopper by a weld seam 44 or the like. Along the other edge 45 of the shutter plate, two or more key holes 46 are provided. Each key hole has a longitudinally directed, narrow part 47 and a terminal wide part 48 at the left end thereof as seen in Figure 8. At distances matching those between the key hole openings 48, pins 49 are secured to the hopper bottom 37. Their heads are small enough to pass through the wide parts 48 but large enough to retain the shutter areas adjacent the narrow parts 47 of the key hole openings.

The shutter plate 39 is concave to the top, as is the bottom 37 of the hopper. When the shutter plate is in place, the two curvatures are substantially identical. When free and uninstalled, the shutter plate is preferably flat or curved to a larger radius. It will then be forced against the bottom plate with some pressure, when being installed. This prevents material from being caught between the two plates, in the operation of the unit. Longitudinal sliding of the shutter plate is effected by the adjustment mechanism. For this purpose the plate 39 has, on or adjacent the free edge 45, a tab or flange 50. This is engaged by one arm 51 of a bell crank 52, pivoted to the hopper at 53. The other and preferably longer arm 54 of the bell crank is engaged by a rod 55, extending below and along the pusher bar 24. This rod in turn is shifted by a cam and lever disk 56, secured to and rotatable with the handlebar 28. The disk 56 rotates or rocks in a vertical plane, preferably in the middle of a yoke 57 at the free end of the pusher bar 24. By such rotation or rocking, the rod 55 is moved forward and backward. As a result, the bell crank arm 51 and shutter plate 39 are moved from right to left, and reverse.

Sliding to the left, as seen in Figure 8, is stopped when the right-hand ends of the narrow parts 47 of the key holes 46 contact the necks of the pins 49. These ends are so spaced that in the corresponding setting of the shutter plate, the apex of each triangular opening 38 is just at or slightly beyond the left side of the corresponding hopper opening 36. In this manner the spacing of the openings 38, 46 determines a definite closed position of the spreader unit, which can also be used as a starting point for the other adjustments.

These other adjustments require mainly a correlation of the shutter 39 with the control member 56. This is facilitated, regardless of unavoidable inaccuracies in economical quantity production, by a longitudinal adjustment of the rod 55. For this purpose the rod 55 is shown as consisting in two pieces 55-A, 55-B, preferably of uniform length and form, which are interconnected by a longitudinally adjustable friction joint 58. The joint is assembled by compression between a bolt 59 and nut 60. The free end of each rod section 55-A and 55-B is bent to form a finger 61, suitably inserted in the corresponding part 54, 56 and held thereto by a cotter pin 62.

The opening movements of the shutter plate 39 require a particularly accurate control, since a variety of "open" positions is required. Some of the materials to be dispensed are very strong, so that small amounts thereof must be distributed in order to avoid burning of plants and irregularity of seeding. For instance, it is sometimes necessary to distribute as little as one-eighth of a pound over one hundred square feet. Regardless of the material and the shutter openings used, it is often necessary to change quickly from the open to closed condition of the shutter and then to return just as quickly to the proper open condition; for instance, when pushing the spreader over a strip that has previously been covered.

Such control, with a practically infinite variety of shutter openings, is provided by a cam surface 63 on the cam and lever disk 56, cooperating with a peripheral stop edge 64 on the adjustment and stop disk 65. As best shown in Figure 4, the cam and lever disk 56 is traversed by a sleeve 65'. This sleeve, as shown in Figures 10–14, is secured to the handlebar 28 by a set screw 66. The handlebar itself is rotatably held in bushings 67, secured to the yoke 57. Clockwise rotation of the handles 26, 27, as seen in Figures 4, 10, etc., causes a lever section 68 in the lower part of the cam and lever disk 56 to move forward (toward the hopper 21). This moves the rod 55 forward, thereby moving the bell crank arm 51 and shutter 39 to the left as seen in Figures 4 and 8. This tends to close the spreader, subject to the stop at 49. On the other hand, a counterclockwise rotation of the handles 26 and 27 tends to open the spreader.

Such counterclockwise rotation is allowed subject to a stop action, which in this case is established by the cooperation of the cam and stop disk surfaces 63, 64. In order to facilitate adjustment of the "open" setting, a cam surface 63, disposed in the upper part of the cam and lever disk 56, diverges upwardly from the sleeve; and opposite this cam a circular stop disk 65 with evenly spaced graduations is secured to the pusher yoke 57, in a plane transverse to that of the cam disk.

The transverse arrangement of the two control disks or plates—as shown, an arrangement at right angles—is generally shown and explained in my co-pending application Serial No. 159,013, now Patent No. 2,634,029. It has the advantage that a very small force is sufficient to hold the adjustment disk 65 against displacement by vibration and the like. Such force is obtainable for instance by a light spring washer 69. Such a washer is placed on top of the stop disk 65, around a stud 70 secured to the narrow part of the yoke 57. The spring washer 69 and plate 65 are held against the yoke by a light, manually operated wing nut 71, threaded upon the stud 70.

As best shown in Figure 2, the hole 72 in the stop plate 65, for the stud 70, is eccentric to the circular edge 64 of the plate. One-half of the periphery of the plate, from its point of greater approach to the eccentric hole 72 to the opposite point, is marked with graduations, lettered "1" to "10" as shown. Of course these graduations can also be identified in other manners, for instance by reference to different types of fertilizers, seeds or the like. They are angularly spaced by uniform distances from one another. With suitable curvature of the cam surface 63, such uniform angular surfaces correspond to uniform linear distances of shutter movement.

The user, while pushing or holding the spreader, can see and if necessary readjust the calibration disk 65, the graduated surface of which faces upward. When he sees the disk, for instance, in the position of Figure 2, he finds the graduation "6" opposite the cam disk 56, indicating adjustment for particles of size "6." Adjustment to particles of half that size, to be distributed in equal numbers per square foot, is effected by turning the calibration disk to "3" (subject to correction in view of discharge constants, which are best determined empirically).

Figure 10 shows the unit adjusted to "10." In this position, where the smallest radius of the disk 65 is turned toward the cam lever 56, maximum counterclockwise rocking of the cam lever is possible before the cam surface 63 is stopped by the disk surface 64. Accordingly, in this position of disk 65 the lever part 68 is moved far to the right, the rod 55 far to the rear, and the shutter plate 39 sufficiently far to the right, as seen in Figure 8, to expose maximum discharge areas of the openings 36, 38. In such position of the shutter plate, the pins 49 are still in engagement with the narrow parts 47 of the key holes 46, although adjacent the wide parts 48. Accidental shaking loose of the shutter plate from the hopper is safely prevented by this engagement.

Assuming that the adjustment mechanism is set as shown in Figure 10, and that the operator has to close the shutter suddenly, while not interrupting his forward pushing of the spreader, this can be effected promptly by turning the handles 26 and 27 clockwise into the position shown in Figure 11. Likewise the return to the proper operative position of Figure 10 can be effected promptly and accurately, by opposite turning of the handles. All this can be done without releasing the normal two-handed manual grip on the pusher bar. If necessary, the unit can also be operated in the same easy manner with occasional changes from full opening to partial closing of the shutter.

When a new type of material must be distributed, a more permanent readjustment of the shutter openings is effected. For this purpose the wing nut 71 is loosened. The calibration disk 65 is then rotated into the proper position for the new material, while the handles 26 and 27 are held in the shutter closing position. The wing nut is then tightened, and the device is ready for operation again.

Figures 12 and 13 show open and closed positions, respectively, for work with extremely restricted distributor openings. In this case the calibration disk 65 is adjusted at or adjacent "1." It will be seen that relatively little "play" is then provided between the open and closed positions, as compared with the No. "10" setting of Figures 10 and 11.

Upon continued use, the agitators and other parts require cleaning and maintenance. This may call for removal of the shutter plate from the hopper bottom. Such removal, which may be necessary once a week, once a day, or in some cases oftener, is facilitated by a slot 73 in the calibration disk 65. This slot has an entrance on the disk edge 64, remote from the graduated portion. The slot extends radially to the eccentric hole 72. It has an inner end which is closer to the eccentric opening 72 than is the closest peripheral portion "10." The user can turn the calibration disk to bring the entrance of the slot 73 to a point directly opposite the cam and lever disk 56. He can then rotate the later disk counterclockwise to a greater extent than is possible at "10." The resulting position is shown in Figure 14. It retracts the rod 55 sufficiently to center the pins 49 with the enlarged keyhole portions 48 on the shutter plate, thereby causing or allowing removal of that plate from the spreader.

In the adjustment of Figure 10 a projection or nose 74 on the cam disk 56 stops counterclockwise cam rotation beyond the position shown, even in case of strong vibration or slight bending. In the adjustment of Figure 14 this stopping effect of the nose 74 is eliminated.

Reinsertion of the shutter plate, after the necessary cleaning of the various parts, is effected with the adjustment mechanism in the position of Figure 14. Thereafter, a proper position of the calibration plate 65 is reestablished and secured by the wing nut 71.

This is a continuation-in-part of application Serial No. 289,282 filed May 22, 1952, now Patent No. 2,678,145, dated May 11, 1954, by the present inventor together with F. S. Ajero.

I claim:

1. A material spreader comprising a wheel-supported bin; a shutter shiftably mounted on the bin to control discharge of material therefrom; pusher means secured to the bin and extending backwards therefrom; an elongated, straight handlebar extending transversely of the free end of the pusher means and secured rotatably about its long axis; means rotatable with the handlebar and operatively connected with said shutter so as to shift the shutter by distances proportioned to such rotation; and means to limit such rotation, independently of the shutter.

2. A material spreader comprising a wheel-supported bin; a shutter plate mounted on the bin to control discharge of material therefrom; a beam secured to and extending from the bin; an elongated, straight handle bar extending transversely of the free end of the beam and secured thereto rotatably about its long axis; a lever secured to the handlebar and linked to the shutter plate so that rotation of the handlebar rocks the lever and reciprocates the shutter plate correspondingly; and means to limit rotation of the handlebar, at least in one direction, independently of the shutter.

3. A spreader as described in claim 2, wherein the means to limit rotation comprises an abutment adjustably mounted on the beam to stop rocking of the lever in one direction thereof.

4. A spreader as described in claim 3 wherein the abutment is adapted to stop opening movements of the lever and shutter plate; the spreader comprising an additional abutment, directly engaging the shutter plate and adapted to stop it in a closed position.

5. A spreader as described in claim 4 wherein the additional abutment is also adapted to retain the shutter plate on the hopper at least in a series of positions of the shutter plate.

6. A spreader as described in claim 2 comprising a rod to link the lever to the shutter plate; said rod being formed of two similar parts, the spreader additionally comprising means to adjust the length of said rod.

7. A material spreader comprising a wheel-supported bin; a shutter plate mounted on said bin to control discharge of material therefrom; a pusher bar secured to the bin and extending backwards therefrom; a handlebar extending transversely of the back end of the pusher bar and rotatably secured thereto; a disk secured to the handlebar, rotatable therewith, operatively connected with said shutter plate so as to control reciprocation of said shutter plate, and having a cam surface diverging from the center of rotation of the disk; and an adjustable abutment plate mounted on the pusher bar in a plane intersecting said cam surface in order to stop rotation of the disk in one direction and thereby to provide a predetermined setting of the shutter plate relative to the bin.

8. A material spreader comprising a caster mounted bin; a shutter plate on the bin, shiftable through a series of operative positions to control the discharge of material from the bin and also shiftable into an inoperative position wherein the plate can be removed from the bin; a pusher bar secured to the bin; a handlebar extending transversely of the free end of the pusher bar and rotatably secured thereto; a cam secured to the handlebar, rotatable therewith, and connected to operate said shutter plate; and abutment means for the cam to control shifting of the shutter plate to different operative positions thereof and also to control shifting of the shutter plate into said inoperative position.

9. A spreader as described in claim 8 wherein the abutment means comprises a circular disk eccentrically mounted on the pusher bar adjacent the cam in a plane intersecting the same, with graduations peripherally marked on the disk from a short radius portion thereof to a large radius portion thereof, and with a recess extending into the disk beyond the short radius area.

References Cited in the file of this patent

UNITED STATES PATENTS

| | | |
|---|---|---|
| 509,856 | Allen | Dec. 5, 1893 |
| 1,795,660 | Mayer | Mar. 10, 1931 |
| 1,882,340 | Ryan | Oct. 11, 1932 |
| 1,888,821 | Fearn | Nov. 22, 1932 |
| 1,940,606 | Ryan | Dec. 19, 1933 |
| 2,064,504 | Thompson | Dec. 15, 1936 |
| 2,317,288 | McCubbin | Apr. 20, 1943 |
| 2,318,064 | Delaney | May 4, 1943 |
| 2,510,231 | Juzwiak | June 6, 1950 |
| 2,541,008 | Stahmer et al. | Feb. 6, 1951 |
| 2,618,405 | Morris | Nov. 18, 1952 |